United States Patent [19]
Bardot et al.

[11] Patent Number: 4,925,566
[45] Date of Patent: May 15, 1990

[54] ULTRAFILTRATION, HYPERFILTRATION OR DEMINERALIZATION ELEMENT, ITS PRODUCTION PROCESS AND ITS USE FOR THE TREATMENT OF LIQUID RADIOACTIVE EFFLUENTS

[75] Inventors: Colette Bardot, Villeurbanne; Pierre Bergez, Paris; Charles Eyraud; Lahcen Ilahiane, both of Lyons, all of France

[73] Assignee: Commissariat A L'Energie Atomique, Paris, France

[21] Appl. No.: 64,316

[22] Filed: Jun. 18, 1987

[30] Foreign Application Priority Data

Jun. 20, 1986 [FR] France ............................ 86 08947

[51] Int. Cl.$^5$ .......................................... B01D 13/00
[52] U.S. Cl. .................................. 210/651; 210/654; 210/490; 427/245
[58] Field of Search ................. 210/654, 490, 651; 55/16, 158; 427/244, 245, 246

[56] References Cited

U.S. PATENT DOCUMENTS

| | | | |
|---|---|---|---|
| 3,615,024 | 10/1971 | Michaels | 210/500.1 X |
| 3,657,402 | 4/1972 | Stana et al. | 264/45 |
| 4,230,463 | 10/1980 | Henis et al. | 55/16 |
| 4,277,344 | 7/1981 | Cadotte | 210/654 |
| 4,346,126 | 8/1982 | Kutowy et al. | 427/209 |

FOREIGN PATENT DOCUMENTS

| | | |
|---|---|---|
| 0139806 | 12/1983 | European Pat. Off. . |
| 2052236 | 4/1970 | Fed. Rep. of Germany . |
| 3342823 | 6/1985 | Fed. Rep. of Germany . |
| 425563 | 4/1911 | France . |
| 2089396 | 7/1972 | France . |
| 2478482 | 9/1981 | France . |
| 59-206008 | 11/1984 | Japan . |
| 134116 | 10/1919 | United Kingdom . |
| 1197572 | 7/1970 | United Kingdom . |

*Primary Examiner*—Frank Spear
*Attorney, Agent, or Firm*—Nutter, McClennen & Fish

[57] ABSTRACT

An ultrafiltration, hyperfiltration or demineralization element comprises a porous inorganic material support and an asymmetrical, cellular, microporous organic polymer membrane, produced on one of the faces of the porous support and fitted into the pores of the porous support flush with said surface and without projecting beyond the same.

The element is prepared by coating the inner surface of a tubular porous support with a coating solution of the organic polymer and then subjecting the coated support to a polymer insolubilization stage, which can be carried out by partial evaporation, followed by the immersion of the coated support in a coagulating bath.

17 Claims, 2 Drawing Sheets

ULTRAFILTRATION, HYPERFILTRATION OR DEMINERALIZATION ELEMENT, ITS PRODUCTION PROCESS AND ITS USE FOR THE TREATMENT OF LIQUID RADIOACTIVE EFFLUENTS

BACKGROUND OF THE INVENTION

The present invention relates to the production of ultrafiltration, hyperfiltration or demineralization elements having simultaneously good mechanical properties, particularly a good rigidity and pressure resistance, and good physicochemical properties, particularly a high permeability, small size pores with a narrow distribution around the mean value and optionally a marked ionic character. Hitherto elements of this type have been produced either from inorganic materials, or from organic materials.

When use is made of inorganic materials, it is possible to produce elements having good mechanical characteristics and interesting physicochemical properties with regards to the permeability, the dimensions of the pores and their distribution, by depositing on a macroporous mineral support a microporous mineral layer, which can e.g. be obtained from a peptized gel, as described in French patent No. 2 550 953 filed on 12.4.1977 in the name of the Commissariat à l'Energie Atomique.

As a result of the properties of the macroporous support, said elements have a good rigidity and pressure resistance and the production of the microporous layer from a peptized gel makes it possible to obtain the desired distribution and pore sizes, as well as a high permeability. However, such elements cannot have a marked ionic character.

When use is made of organic materials, the standard practice is to produce organic polymer membranes, e.g. by casting from a solution of the polymer in an appropriate solvent, followed by evaporation of the solvent. The polymers which are more particularly used are cellulose esters and it is possible to obtain therefrom semipermeable membranes suitable for the demineralization of salt water, such as sea or ocean water and as described in U.S. Pat. No. 3 133 132, filed on 29.11.1960 in the name of S. Loeb et al.

These organic membranes have very interesting physicochemical properties for separations by ultrafiltration or demineralization, particularly due to the fact that it is possible to functionalize them by introducing into the polymer anionic or cationic groups, which is advantageous when they are used for the demineralization of not very concentrated saline solutions and the ultrafiltration of colloids. However, these organic membranes suffer from the disadvantage of being mechanically fragile and of consequently requiring the use of reinforcing and supporting structures. For example, it is possible to use woven or non-woven supports made from a polymer compatible with the organic polymer constituting the membrane. It is also possible to place them on perforated tubular metal supports. However, this requires supplementary fitting operations for the membranes, which is prejudicial to the cost of the installations. They can also be produced in the total thickness of a porous support by impregnating the support with a solution, followed by evaporation of the solvent and as described in EP-A-139 806, DE-A-2 052 236, FR-A-425 563 and GB-A-1 197 572.

Thus, the membranes formed in the porous support have a thickness at least equal to that of the porous support and under these conditions a high permeability cannot be obtained.

Consideration has also been given to producing filters having a porous ceramic support, on which is placed a semipermeable organic polymer microporous membrane, by blocking the pores during the fitting of the organic membrane and then dissolving the pore-blocking material following the fitting of the organic membrane, as described in Japanese patent No. 59/206008, filed under No. 081562 on 10.5.1983 by the TDK Corp.

However, this manufacturing procedure does not make it possible to obtain satisfactory results. Thus, the active layer has an imperfect cohesion with the support and is therefore fragile. Due to its limited thickness and position on the surface, it has a significant fragility or sensitivity to scratches/grooves and impacts, as well as to the tangential force of the flow of fluids to be treated.

Moreover, certain technical difficulties are encountered in finding blocking agents which can be dissolved at the end of the operation without harming the active organic polymer layer.

SUMMARY OF THE INVENTION

The present invention relates to an ultrafiltration, hyperfiltration or demineralization element obviating the aforementioned disadvantages.

The ultrafiltration, hyperfiltration or demineralization element according to the invention comprises a porous inorganic material support and a cellular, asymmetrical, microporous organic polymer membrane, produced on one of the faces of the porous support and fitted into the pores of the porous support flush with said surface and without projecting beyond the surface of the porous support, said membrane having a thickness less than that of the porous support.

Preferably, the radii of the pores of the microporous organic polymer membrane are in the range of 1.5–100 nm.

The structure of the ultrafiltration, hyperfiltration or demineralization elements according to the invention is particularly interesting. Thus, these elements are naturally supported by the macroporous inorganic material support. They consequently have a good pressure resistance, as well as good mechanical properties, so that they can be more easily handled and fitted within an installation.

Moreover, due to the fact that the microporous organic polymer membrane is cellular and fitted into the pores of the porous support, it is possible to obtain a non-fragile, robust element not suffering from the disadvantages of the filters produced according to the TDK Corp. Japanese patent No. 59/206008, while still having a high permeability, assymetrical, discontinous ultrafiltration layer.

Moreover, the partitioning and compartmentalization of the polymer layer in the pores of the support makes it possible to obviate the difficulties normally encountered in producing planer organic membranes, particularly cracking. Thus, a better anchoring of the layer in the support and better mechanical properties are obtained.

The thickness of the polymer layer covering the pores of the mineral support can be between 25 and 200 micrometers and the upper part of the layer can be set back from the surface of the macroporous support by a distance of approximately 10 μm, which essentially corresponds to the maximum diameter of the surface grains of the support. The macroporous support can have a thickness of 1.5–5 mm.

This limited thickness of the microporous membrane and the element's assymetrical character, i.e. the pore dimensions thereof which are smaller on the surface than in the interior of the porous support, make it possible to obtain elements having a high water permeability.

These elements can be manufactured by easily performed processes making it possible to choose the porosity and permeability characteristics of the microporous membrane within an extensive range.

The inorganic material macroporous supports can be produced from a metal or metal alloy, e.g. nickel or a nickel alloy, stainless steel or any alloy insensitive to the corrosion in the medium used, porous carbon, or a ceramic material, such as an oxide, a carbide, a nitride or a silicide, e.g. of alumina or silicon carbide.

Preferably, in order to obtain a good attachment of the microporous membrane in the pores of the macroporous support, use is made of a porous support, whereof the surface or surfaces for receiving the microporous membrane have a thin finishing coating, whose pores have a mean pore radius smaller than the mean pore radius of the remainder of the porous support. For example, the thin finishing coating can have a mean pore radius of 0.01–10 μm.

The porous support can have any random shape. Thus, it is possible to use planer porous supports, tubular porous supports or even porous supports shaped like modules perforated by channels. They can also be provided with ribs, e.g. helical ribs, in order to promote the turbulence of the fluid to be treated at the element.

When use is made of a tubular porous support, the organic polymer microporous membrane is generally produced on the inner surface of the tubular support. When a porous support shaped like a module with longitudinal channels is used, the microporous organic polymer membrane is generally produced on the inner surface of the channels.

The use of such modules is particularly interesting, because they can easily be assembled to constitute an ultrafiltration installation having a large number of channels for the passage of the fluid to be treated.

The organic polymer membranes disposed on this porous support can be produced from different organic polymers, which are chosen as a function of the intended use of the element.

Generally, use is made of polymers which can be brought into membrane form by conventional processes of casting a solution followed by evaporation of the solvent, e.g. polymers such as polysulphones, polyamides, cellulose esters, cellulose ethers and ionomers having a marked ionic character.

In particular, use is made of polymers which have been modified so as to incorporate cationic and/or anionic groups, e.g. sulphonated or quaternized polymers, such as sulphonated polysulphones.

The use of such polymers gives the membrane obtained the possibility of carrying out separations, on the one hand by a sieve effect (retention of solids, macromolecules and colloids) 1 and on the other hand by the Donnan effect (retention of ionic solutes due to the ionic character of the membrane). This is of particular interest for certain applications, such as the demineralization of water.

The invention also relates to a process for producing an ultrafiltration, hyperfiltration and/or demineralization element satisfying the above characteristics.

This process comprises:
(a) coating one of the surfaces of a porous inorganic material support with a coating solution constituted by a solution of the organic polymer in at least one solvent and
(b) insolubilizing the organic polymer of the coating solution by performing the following successive steps
  (1) partial evaporation of the solvent or solvents of the coating solution,
  (2) coagulation of the polymer by immersing the coated support in a coagulation bath not dissolving the polymer, but while being miscible with the solvent or solvents of the coating solution and
  (3) heat treatment of the assembly in a liquid dissolving neither the polymer, nor the porous support.

This process for producing the microporous membrane by phase inversion has numerous advantages, because it is easy to perform and makes it possible to regulate the porosity and permeability characteristics of the microporous layer. This can be carried out by appropriately choosing the composition of the coating solution, the evaporation time, the composition and temperature of the coagulation bath, as well as the duration, temperature and liquid used for the heat treatment. Thus, by acting on the polymer content of the coating solution, on the addition of additives not dissolving the polymer and on the relative proportions between the solvents and additives, it is possible to cover an extensive range of pore radii and permeabilities. Moreover, this preparation procedure makes it possible to obtain an asymmetrical membrane and the presence of the porous support at the time of the successive evaporation and coagulation operations which normally subject the organic polymer to considerable stresses, makes it possible to avoid the risks of cracking the microporous membrane due to the partitioning thereof within the pores of the porous support, contrary to what takes place when producing a homogenous, planer membrane or a membrane located on the surface of a ceramic support in accordance with the process of Japanese patent No. 59/206008.

The solvents used for preparing the coating solution are generally organic solvents, to which water can be optionally added. Examples of organic solvents which can be used with polysulphones are formamides, such as dimethyl formamide, mixtures of dioxan and tetrahydrofurane, dimethyl sulphoxide and tetrahydrothiophene dioxide (Sulfolane).

It is possible to add to the coating solution, additives which do not dissolve the polymer, but which act as a blowing agent, e.g. a perchlorate in the case of producing cellulose ester membranes, It is also possible to add to the coating solution additives such as water and alcohols for regulating the viscosity to appropriate values generally in the range 70–700 cp or 7–70 Pa.s.

The support can be coated by a method making it possible to spread out the coating solution at a constant speed chosen as a function of the viscosity of the solution, e.g. at a speed of 1.6–10 cm.s$^{-1}$ for viscosities between 7 and 70 Pa.s.

When the support is a tubular porous support and it is wished to dispose the organic polymer membrane on the inner surface of the tubular support, it is more particularly possible to use a device having two rubber washers or discs, which are positioned within the porous support by interposing the coating solution between them, the sealing being ensured by means of these washers. By moving the porous support along the rubber washers at an appropriate speed, the inner surface of the porous support is coated.

Coating can be carried out in an identical manner with a device only having a single rubber washer, which is positioned at the lower end of the tubular porous support. In this case, the coating solution is introduced above the rubber washer and the latter is moved upwards by means of a mobile rod.

Following this coating operation, according to the preferred embodiment of the inventive process, the solvent or solvents of the coating solution are partly evaporated. This can be carried out at ambient temperature for between 1 and 600 seconds, chosen as a function of the pore size which it is wished to obtain. Thus, the longer the drying time, the smaller the pore radius. Generally periods of 90-360 s are used for obtaining pore radii suitable for the demineralization of water.

Following the partial evaporation of the solvent, the coated support undergoes the insolubilization treatment, which consists of immersing the coated support in a coagulation bath chosen so as to dissolve neither the polymer, nor the porous support, while being miscible with the solvent or solvents present in the coating solution. For example, it is possible to use as the coagulation bath an aqueous sodium nitrate solution and operate at temperatures below ambient temperature, e.g. at 0-20° C.

Following this insolubilization operation, the assembly undergoes a heat treatment performed in a liquid dissolving neither the polymer, nor the porous support. For example, the liquid used can be pure water, while working at a temperature of 50-95° C. for between 10 minutes and 3 hours.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The following examples all illustrate the production of filters on tubular porous alumina supports within which are produced cationic sulphonated polysulphone membranes from Imperial Chemical Industries and having a sulphonation level corresponding to one sulphonated chain unit out of ten.

The tubular porous alumina supports are 54 cm long, have an internal diameter of 1.5 cm and an external diameter of 1.9 cm. They are all in the form of composite supports, i.e. supports constituted by porous tubes having a mean pore radius of 7.5-10 $\mu$m, whose inner surface is covered with an alumina layer with a thickness of 2-30 $\mu$m and a mean pore radius of 0.5-1 $\mu$m.

Figure 3:
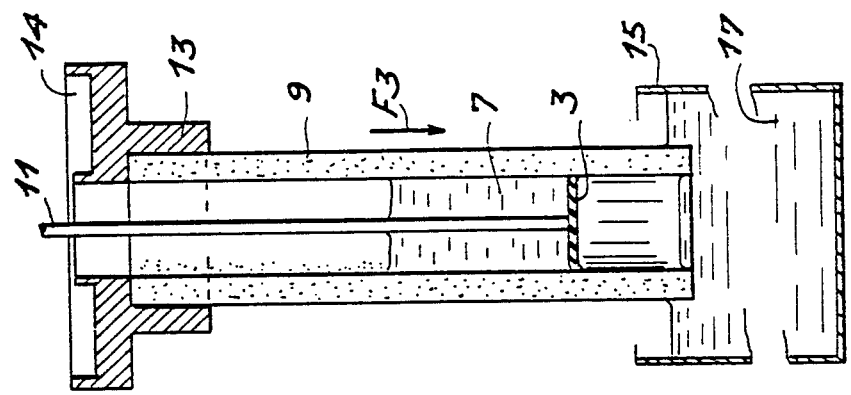
FIG. 3 diagrammatically the successive performance of the coating and coagulation stages.
Figure 2:
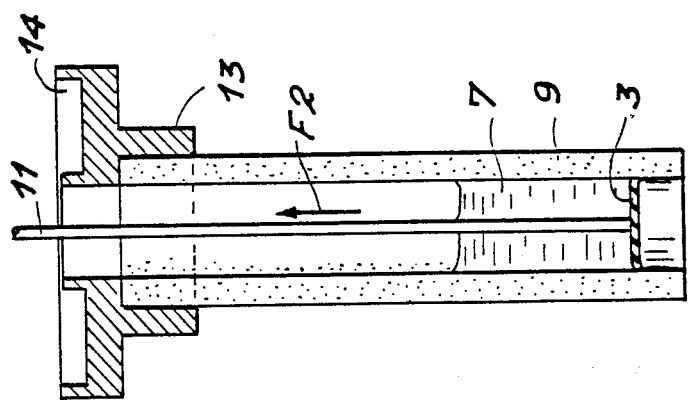
FIG. 2 diagrammatically another device for coating a tubular porous support.
Figure 1:
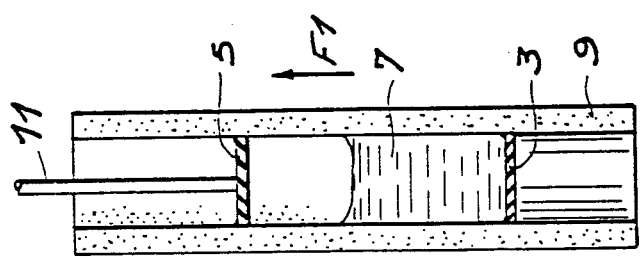
FIG. 1 diagrammatically a device for coating a tubular porous support.

In order to produce ultrafiltration elements according to the invention, firstly a coating solution is prepared from sulphonated polysulphone, dimethyl formamide, Sulfolane (tetrahydrothiophene dioxide) and optionally water, followed by the coating of the porous alumina support using the device according to FIGS. 1,2 or 3.

FIG. 1 shows that the device comprises two rubber washers 3,5 between which is disposed the coating solution 7 within the tubular support 9. The rubber washers 3 and 5 have diameters slightly larger than the internal diameter of the tubular support 9 and are fixed to a fixed, threaded rod 11 by means of nuts, which are not shown in the drawings. These washers are formed from 1 mm thick rubber sheets with a diameter of 16 mm. In this embodiment, the tubular support 9 is moved from bottom to top (arrow $F_1$), the lower washer 3 ensuring the tightness or sealing, whereas the upper washer 5 makes it possible to remove the excess coating solution from the surface of the support. These washers are sufficiently flexible, elastic and deformable to be used with a ribbed support.

FIG. 2 shows another coating device and the same references are used for designating the components common to both systems. In this case, the tubular porous support 9 is fixed and mounted on an upper system 13 having an excess coating solution recovery tank 14. The device only has a single rubber washer 3 identical to that used in FIG. 1 and the mobile rod 11 can move upwards in the direction of arrow $F_2$. In this case, washer 3 simultaneously ensures the sealing and the elimination of excess coating solution deposited on the porous support 9. At the end of the operation, the excess coating solution is collected in tank 14.

FIG. 3 shows a device identical to that of FIG. 2, the difference being that in this case rod 11 is fixed, whereas the porous support system 9 and the raising system 13 can move in the direction of arrow $F_3$. Thus, it is possible to carry out coagulation in bath 17 with a strictly constant drying time over the entire length of the filter.

During the operation of coating porous support 9, the solution enters the surface alumina grain layers by capillarity and the penetration depth is dependent on the displacement speed of the porous support 9 or rod 11, as well as the viscosity of the coating solution. This penetration depth can vary in the quoted examples from 100-200 $\mu$m.

This operation is followed by the partial evaporation of the solvent or solvents at ambient temperature for a period $t_1$, which can vary from 90-360 s.

The polysulphone is then insolubilized by immersion of the coated support in a coagulation bath constituted by an aqueous sodium nitrate solution containing 125 g/l of $NaNO_3$ at a temperature of 4° C., which is followed by heat treatment by immersing the element in pure water at 80° C. for one hour.

Following this operation, the surface roughness characteristics of the support are the same as those of the initial surface alumina layer.

FIG. 3 shows the continuous performance of the stages of coating, evaporating and insolubilizing the polysulphone. In this case, the rubber washer 3 is mounted on a fixed rod 11 and the assembly constituted by porous support 9 mounted on system 13 can move in the direction of arrow $F_3$. Thus, the support is introduced, after coating, into a container 15 filled with the coagulating bath 17. In this way, by appropriately regulating the displacement speed of the porous support 9 and the initial distance between the porous support and the coagulating bath 7, it is possible to carry out coating and coagulation of the polymer in a continuous manner with a strictly constant drying time between these two operations.

These operations are repeated by using different coating solutions and different drying times and, after heat treatment, the permeability to pure water and the mean pore radius of the elements obtained are determined. The mean pore radius is determined by ultrafiltration of dextran solutions. As the molecular weight M is linked with the Stokes Einstein radius by the expression:

$$r_s = 0.33(M)^{0.463}$$

it is possible to define $r_{50}$ and $r_{90}$: radii corresponding to 50% and 90% rejection level and whereof the ratio makes it possible to evaluate the dispersion of the distribution of the pore radii.

The results obtained for different coating solutions and different drying times are given in the attached Table 1. On the basis of the results given in Table 1, it is found that:
- the water permeability decreases when the evaporation time increases and this also applies to the mean pore radius (see examples 1–3).
- the permeability and dispersion of the pore radii defined by the ratio r90/r50 decreases when adding water to the coating solution (see examples 4–6 and 1–7),
- this addition of water to the coating solution is particularly decisive regarding the homogeneity of the texture of the filter, because on the basis of a not very concentrated solution, the process makes it possible to obtain a pore radius dispersion comparable to that of more concentrated solutions and with a higher permeability (comparison between Example 6 and Examples 1,2,3 and 7) and
- the permeability and mean pore radius are highly dependent on the sulphonated polysulphone contents of the coating solution (see examples 1–4).

Figure 4:
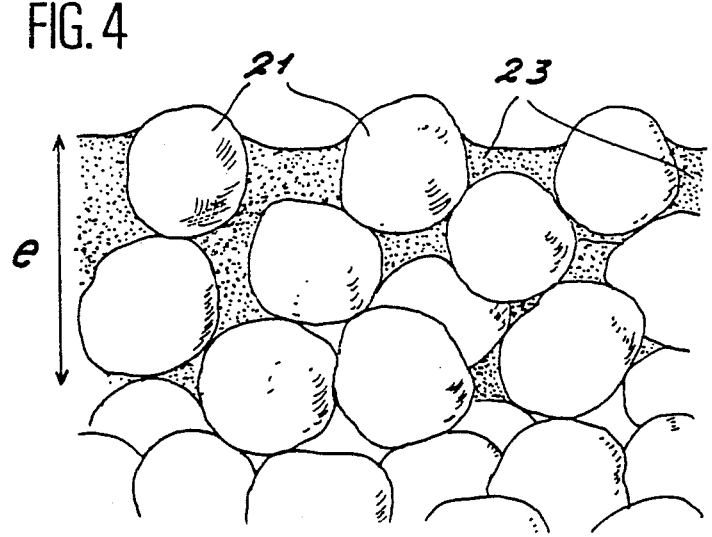
FIG. 4 diagrammatically the structure of the element obtained according to the invention.

FIG. 4 diagrammatically shows the structure of the element obtained according to the inventive process. It can be seen that the element has a porous support with, on its surface, alumina grains 21, which define between them pores having a mean radius of 0.5–1 μm. Between the grains 21 of this surface layer of the support, the organic polymer, cellular microporous membrane 23 is located on the surface of the support, while being fitted into the pores flush with said surface and without passing beyond it, the cellular membrane 23 being slightly set back with respect to the grains 21 flush with the surface of the porous support. This membrane 23 penetrates the porous support and its thickness e can vary from a few to 200 microns, as has been shown hereinbefore.

It is pointed out that in this structure, the microporous organic polymer membrane 23 is partitioned or cellular and is well anchored in the porous support and has no fragility points. Moreover, during the fitting of the membrane, the partitioning thereof between the porous support grains 21 makes it possible to avoid the development of considerable stresses in layer 23 during the operations of drying and coagulation, thus preventing cracking.

Figure 5:
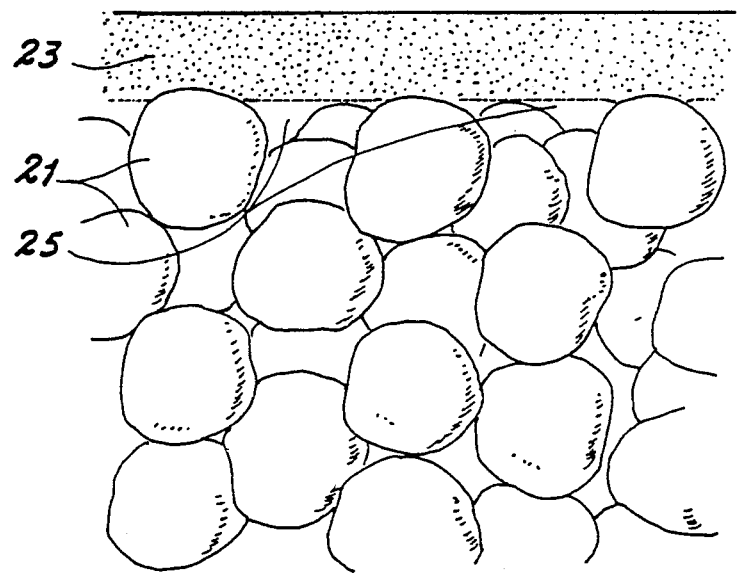
FIG. 5 diagrammatically the structure of the element obtained according to Japanese patent No. 59/206008.

FIG. 5 shows for comparison the structure of the element obtained according to Japanese patent No. 59/206008. In this case, membrane 23 is disposed on the surface of the porous support above grains 21, without being fitted into the pores of the support. Therefore membrane 23 has fragilization zones, particularly at locations 25, which correspond to the pores of the porous support. Moreover, during the production of this membrane, the development of considerable stresses therein during successive drying and coagulation operations produces cracking defects.

The ultrafiltration elements according to the invention can be used for the demineralization of water, due to the ionic character of the polymer used. In this case, the salt rejection level is dependent on the texture of the element, the degree of sulphonation of the polysulphone, the valency of the co-ion of the solute, the radius of the counter-ion, i.e. interaction effects between the membrane and the counter-ion and the concentration of the solute.

The attached Table 2 gives the results obtained by using the ultrafiltration elements of Examples 1 and 8 for the elimination of $Na^+$ and $Cu^{2+}$ ions at various concentrations, in the form of hydroxide, chloride or sulphate in aqueous solution at different pHvalues using tangential ultrafiltrations. The tests using the element of Example 8 show the influence of the valency of the co-ion and the radius of the counter-ion. In order to obtain these results, the aqueous solution containing the ion to be eliminated was circulated within the tube forming the ultrafiltration element under a pressure of 0.3 MPa (3 bars) and a flow rate of 500 l.h$^{-1}$. Outside the tube was then collected a demineralized solution and at the tube outlet an ion-enriched solution, the ion rejection level (in %) being defined by the following formula:

$$R\% = \frac{C_0 - C_p}{C_0} \times 100$$

with Cp representing the concentration of the permeate and Co the concentration of the stock solution.

This table also gives the results obtained by using the element of Example 9 for eliminating the $Co^{2+}$, $Mn^{2+}$ and $Na^+$ simultaneously present in an aqueous solution.

Although a description has been given here of the use of elements for the demineralization of water, it is obvious that the elements according to the invention can be used in other separation processes and jointly in ultrafiltration and demineralization operations, e.g. for the ultrafiltration of macromolecules with applications in the agroalimentary, pharmaceutical and chemical industries, as well as for the treatment (demineralization and ultrafiltration) of radioactive liquid effluents containing small concentrations of ions such as Co, Mn, Pb, Ag and/or Cs. It is also possible to use porous supports other than alumina and organic polymers other than sulphonated polysulphone as used in the examples.

TABLE 1

| | Coating Solution | | | | | Water permeability (in $m \cdot d^{-1} \cdot Pa^{-1}$) | $r_S$ (in nm) | | Dispersion $r_{50}/r_{90}$ |
| | Sulphonated polysulphone (in g) | DMF (in $cm^3$) | Sulfolane (in $cm^3$) | Water (in %) | Evaporation time (in s) | | R = 50% $r_{50}$ | R = 90% $r_{90}$ | |
|---|---|---|---|---|---|---|---|---|---|
| Ex. | | | | | | | | | |
| 1 | 15 | 30 | 20 | — | 90 | $0.38 \cdot 10^{-5}$ | 4.2 | 9.1 | 2.16 |
| 2 | " | " | " | — | 180 | $0.30 \cdot 10^{-5}$ | 2.7 | 6.1 | 2.25 |
| 3 | " | " | " | — | 360 | $0.30 \cdot 10^{-5}$ | 2.5 | 5.2 | 2.08 |
| 4 | 10 | 35 | 25 | — | 90 | $2.5 \cdot 10^{-5}$ | 2.9 | 30.2 | 10.4 |
| 5 | " | " | " | 6.07 | 90 | $1.95 \cdot 10^{-5}$ | 2.7 | 14.3 | 5.3 |
| 6 | " | " | " | 9.87 | 90 | $1.55 \cdot 10^{-5}$ | 3.6 | 9.4 | 2.6 |
| 7 | 15 | 30 | 20 | 2.77 | 90 | $0.30 \cdot 10^{-5}$ | 2.4 | 6.0 | 2.5 |
| 8 | 15 | 30 | 20 | — | 360 | $0.05 \cdot 10^{-5}$ | — | — | — |
| 9 | 15 | 55 | — | — | 60 | $0.9 \cdot 10^{-5}$ | — | — | — |

TABLE 2

| | Ion to be eliminated. | | | | Rejection level (in %) |
| Element | Nature | Concentration (in ppm) | In form | pH | |
|---|---|---|---|---|---|
| of Ex. 1 | $Na^+$ | 7 | NaOH | 8.5 | 88.8 |
| of Ex. 1 | $Na^+$ | 31 | NaCl | 8.5 | 68 |
| of Ex. 1 | $Na^+$ | 230 | NaCl | 8.5 | 13 |
| of Ex. 8 | $Na^+$ | 55 | NaCl | 5.5 | 60 |
| of Ex. 8 | $Cu^{++}$ | 50 | $CuSO_4$ | 5.5 | 47.8 |
| of Ex. 8 | $Cu^{++}$ | 50 | $CuCl_2$ | 5.5 | 29.8 |
| of Ex. 9 | $Co^{++}$ | 4 | $CoSO_4$ | 6.2 | 40 |
| | $Mn^{++}$ | 4 | $Mn(NO_3{}_2)$ | 6.2 | 35 |
| | $Na^+$ | 2–65 | NaCl | 6.2 | 15 |

What is claimed is:

1. An ultrafiltration element comprising a porous inorganic material support and a cellular, microporous organic polymer membrane produced on one of the faces of the porous support and fitted into the pores of the porous support flush with said surface and without projecting beyond the porous support surface, said microporous membrane having a thickness less than that of the porous support and the pores of said membrane having radii in the range of 1.5 to 100 nm.

2. An element according to claim 1, wherein the membrane thickness is is 25 to 200 $\mu m$ and the porous support thickness 1.5 to 5 mm.

3. An element according to claim 1, wherein the inorganic material is a metal or an alloy.

4. An element according to claim 1, wherein the inorganic material is carbon.

5. An element according to claim 1, wherein the inorganic material is a ceramic material chosen from the group consisting of oxides, carbides, nitrides and silicides.

6. An element according to claim 5, wherein the inorganic material is alumina.

7. An element according to claim 1, wherein the organic polymer is chosen from the group consisting of polysulphones, polyamides, cellulose esters and cellulose ethers.

8. An element according to claim 1, wherein the organic polymer comprises cationic and/or anionic groups.

9. An element according to claim 8, wherein the organic polymer is a sulphonated polysulphone.

10. An element according to claim 1, wherein the surface of the porous support on which is produced the organic polymer membrane comprises a thin finishing coating, whose pores have a mean pore radius smaller than the mean pore radius of the remainder of the porous support.

11. An element according to claim 10, wherein the thin finishing coating has a mean pore radius of 0.01 to 10 $\mu m$.

12. An element according to claim 1, wherein the porous support is tubular.

13. An element according to claim 12, wherein the organic polymer membrane is produced on the inner surface of the tubular support.

14. An element according to claim 1, wherein the porous support is constituted by a module perforated by channels, within which is produced the organic polymer membrane.

15. An element according to claim 1, wherein the porous support is provided with ribs for promoting turbulence of the fluid to be treated at the element.

16. A process for producing an ultrafiltration element according to claim 1 comprising the steps of
   (a) coating one of the surfaces of a porous inorganic material support with a coating solution constituted by a solution of the organic polymer in at least one solvent so that the coating is formed into the porous support and so that the coating solution is removed from the surface of the porous support; and
   (b) insolubilizing the organic polymer of the coating solution by performing the following successive steps:
      (1) partial evaporation of the solvent or solvents of the coating solution,
      (2) coagulation of the polymer by immersing the coating support in a coagulation bath not dissolving the polymer, while being miscible with the solvent or solvents of the coating solution and
      (3) heat treatment of the assembly in a liquid dissolving neither the polymer, nor the porous support.

17. Use of an element according to any one of the claims 1 to 3 for the demineralization and ultrafiltration of radioactive liquid effluents.

* * * * *